United States Patent
Iwama et al.

(10) Patent No.: US 12,358,455 B2
(45) Date of Patent: Jul. 15, 2025

(54) AIRBAG DEVICE AND OCCUPANT PROTECTION DEVICE

(71) Applicant: TOYOTA JIDOSHA KABUSHIKI KAISHA, Aichi-ken (JP)

(72) Inventors: Toshiki Iwama, Toyota (JP); Mitsuyoshi Ohno, Miyoshi (JP); Yu Suzuki, Nagoya (JP); Tatsuya Hashido, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/762,639

(22) Filed: Jul. 3, 2024

(65) Prior Publication Data

US 2025/0058732 A1  Feb. 20, 2025

(30) Foreign Application Priority Data

Aug. 14, 2023  (JP) ................. 2023-132156

(51) Int. Cl.
*B60R 21/207* (2006.01)
*B60R 21/231* (2011.01)
(Continued)

(52) U.S. Cl.
CPC ...... *B60R 21/207* (2013.01); *B60R 21/23138* (2013.01); *B60R 21/2338* (2013.01); *B60R 21/261* (2013.01); *B60R 2021/0004* (2013.01); *B60R 2021/0048* (2013.01); *B60R 2021/2074* (2013.01); *B60R 2021/23146* (2013.01);
(Continued)

(58) Field of Classification Search
CPC ............... B60R 21/207; B60R 21/261; B60R 2021/2612; B60R 2021/2615; B60Y 2306/09
See application file for complete search history.

(56) References Cited

U.S. PATENT DOCUMENTS 3,953,049 A * 4/1976 Surace .................. B60R 21/18
280/733
7,150,468 B2 * 12/2006 Pan ...................... B60R 21/207
280/730.1
(Continued)

FOREIGN PATENT DOCUMENTS

DE  19850448 B4 *  8/2014  ............. B60R 21/26
JP  3015513 U  9/1995

OTHER PUBLICATIONS

DE-19850448-B4 (machine translation) (Year: 2014).*

*Primary Examiner* — Jason D Shanske
*Assistant Examiner* — Joselynn Y Sliteris
(74) *Attorney, Agent, or Firm* — HAUPTMAN HAM, LLP

(57) ABSTRACT

An airbag device includes an inflator that is installed in an upper part of a vehicle seat, and that generates gas in an event of a vehicle collision, an airbag to which the gas from the inflator is supplied, and is inflated and deployed from the upper part of the vehicle seat toward a front side of the vehicle seat, and a diffuser that distributes the gas to the airbag. The diffuser includes a connecting portion that is connected to the inflator, and a plurality of branching portions that each branch from the connecting portion and connect to the airbag. The diffuser includes a silencing portion in at least the branching portions. The silencing portion reduces sound pressure of the gas.

6 Claims, 10 Drawing Sheets

(51) Int. Cl.
  *B60R 21/2338* (2011.01)
  *B60R 21/261* (2011.01)
  *B60R 21/00* (2006.01)

(52) U.S. Cl.
  CPC ............. *B60R 2021/23386* (2013.01); *B60R 2021/2612* (2013.01); *B60R 2021/2615* (2013.01); *B60Y 2306/09* (2013.01)

(56) References Cited

U.S. PATENT DOCUMENTS

| | | | |
|---|---|---|---|
| 8,007,003 B2 * | 8/2011 | Kalandek | B60R 21/2171 280/740 |
| 10,005,417 B2 * | 6/2018 | Ohno | B60R 21/2334 |
| 10,112,570 B2 * | 10/2018 | Barbat | B60N 2/143 |
| 10,315,609 B2 * | 6/2019 | Thomas | B60R 21/261 |
| 10,556,563 B2 * | 2/2020 | Song | B60R 21/2338 |
| 2024/0123933 A1 * | 4/2024 | Ohno | B60R 21/264 |
| 2024/0123934 A1 * | 4/2024 | Ohno | B60R 21/23138 |
| 2024/0123935 A1 * | 4/2024 | Ohno | B60R 21/2338 |
| 2024/0123936 A1 * | 4/2024 | Ohno | B60R 21/207 |
| 2024/0123937 A1 * | 4/2024 | Ohno | B60R 21/2338 |
| 2024/0123940 A1 * | 4/2024 | Ohno | B60R 21/207 |

* cited by examiner

AIRBAG DEVICE AND OCCUPANT PROTECTION DEVICE

CROSS-REFERENCE TO RELATED APPLICATION

This application claims priority to Japanese Patent Application No. 2023-132156 filed on Aug. 14, 2023, incorporated herein by reference in its entirety.

BACKGROUND

1. Technical Field

The present disclosure relates to an airbag device and an occupant protection device equipped with the airbag device.

2. Description of Related Art

An inflator equipped with a silencer, disclosed in Japanese Registered Utility Model No. 3015513, includes a gas chamber for generating or storing high-pressure gas therein, for inflating an airbag, a first gas orifice provided on a wall of the gas chamber for discharging the high-pressure gas, and a silencer connected to the first gas orifice to supply the gas to the airbag while reducing sound pressure caused by the discharged gas. The silencer has, at one end face thereof, a cylindrical cavity into which the first gas orifice opens and in which the gas discharged from the first gas orifice expands, and a second gas orifice that opens at another end face of the cavity, having a larger cross-sectional area than the first gas orifice, for supplying the gas expanded in the cavity to the airbag. The gas discharged from the gas chamber expands in the cylindrical cavity of the silencer, and pressure thereof is reduced, so that the sound pressure caused by the discharged gas is reduced. This is said to keep the ears of an occupant from being adversely affected even when the inflator equipped with the silencer is installed in a headrest that is near in distance to the ears of the occupant.

SUMMARY

In the above related art, the silencer fixed to the end face of a cylinder type inflator has a cylindrical cavity having a larger outer diameter than that of the inflator, thereby ensuring silencing performance. Accordingly, the overall outer diameter of the inflator equipped with the silencer becomes large, the overall length of the inflator equipped with the silencer becomes long, or the like. As a result, when installing the inflator equipped with the silencer on an upper part of a vehicle seat, space may conceivably be restricted.

The present disclosure has been made in light of the above circumstances, and an object thereof is to provide an airbag device and an occupant protection device equipped with the airbag device in which installability can be improved while securing silencing performance, in a configuration in which an inflator is installed at an upper part of a vehicle seat.

An airbag device according to a first aspect includes an inflator, an airbag, and a diffuser. The inflator is installed in an upper part of a vehicle seat, and that generates gas in an event of a vehicle collision. The gas is supplied to the airbag, which is inflated and deployed from the upper part of the vehicle seat toward a front side of the vehicle seat. The diffuser includes a connecting portion and a plurality of branching portions, and distributes the gas to the airbag. The connecting portion is connected to the inflator. The branching portions each branch from the connecting portion and connect to the airbag. The diffuser includes a silencing portion in at least the branching portions. The silencing portion reduces sound pressure of the gas.

According to the first aspect, in the event of a vehicle collision, gas generated by the inflator installed in the upper part of the vehicle seat is supplied to the diffuser and distributed to the airbag, and the airbag is inflated and deployed from the upper part of the vehicle seat toward the front side of the vehicle seat. The diffuser has the connecting portion connected to the inflator, and the branching portions that are branched from the connecting portion and each connected to the airbag, whereby the gas is distributed to a plurality of locations in the airbag through the branching portions. In this diffuser, at least the branching portions are provided with the silencing portion that reduces the sound pressure of the gas, so even when each of the branching portions is set to have a small diameter, silencing performance can be ensured. Moreover, the branching portions each set to have a small diameter can be routed to fit into space at the upper part of the vehicle seat, and accordingly installability at the upper part of the vehicle seat can be improved.

In the airbag device according to a second aspect, in the first aspect, the airbag may include a front-rear chamber including a pair of extending portions and an airbag body. The extending portions are configured to be inflated and deployed toward the front side of the vehicle seat by both right and left sides of a head of an occupant seated in the vehicle seat, and the extending portions may extend in a front-rear direction. The airbag body may be supplied with the gas through the front-rear chamber, and may be inflated and deployed in front of the occupant. The branching portions of the diffuser may be connected to at least the front-rear extending portions.

According to the second aspect, the airbag has the front-rear chamber and the airbag body. The front-rear chamber includes the extending portions that are inflated and deployed toward the front side of the vehicle seat by both right and left sides of the head of the occupant seated in the vehicle seat. The airbag body is supplied with gas from the inflator through the front-rear chamber, and is inflated and deployed in front of the occupant. The branching portions of the diffuser are connected to at least the extending portions of the front-rear chamber. This enables the gas from the inflator to be distributed to each of the extending portions, and accordingly, installation space, manufacturing costs, and the number of parts can be reduced as compared to a configuration in which gas is supplied to each of the extending portions from separate inflators, for example.

In the airbag device according to a third aspect, in the second aspect, the front-rear chamber may include a linking portion that connects front end portions of the extending portions in a right-left direction of the vehicle seat, and the airbag body may be inflated and deployed toward an occupant side later than the front-rear chamber, on a rear side of the linking portion in a front-rear direction of the vehicle seat.

According to the third aspect, the front-rear chamber of the airbag includes the linking portion that connects the front end portions of the extending portions in the right-left direction of the vehicle seat, and the airbag body is inflated and deployed toward the occupant side later than the front-rear chamber, on the rear side of the linking portion in the front-rear direction of the vehicle seat. When the occupant is restrained, the airbag body is compressed in the front-rear direction of the vehicle seat while stretching the front-rear chamber in the front-rear direction of the seat. This compressive deformation of the airbag body can improve energy absorption performance.

In the airbag device according to a fourth aspect, in any one of the first to third aspects, the silencing portion may be a plurality of partition walls provided inside the diffuser, and the inside of the diffuser may be partitioned into a plurality of chambers by the partition walls, and the chambers may communicate with each other.

According to the fourth aspect, the inside of the diffuser is partitioned into the chambers by the partition walls provided inside the diffuser, and the chambers communicate with each other. Accordingly, the diffuser functions as a partition-wall-type silencer, by which the sound pressure of the gas from the inflator can be effectively reduced.

In the airbag device according to a fifth aspect, in the fourth aspect, the partition walls may be inclined toward a downstream side in a flow direction of the gas flowing inside the diffuser.

According to the fifth aspect, the partition walls provided inside the diffuser are configured as described above, and accordingly, the flow of gas flowing inside the diffuser can be suppressed from being obstructed by the partition walls.

An occupant protection device according to a sixth aspect may include a vehicle seat in which an occupant is seated, and the airbag device according to any one of the first to fifth aspects that is installed in an upper part of the vehicle seat.

According to the sixth aspect, the airbag device is installed in the upper part of the vehicle seat in which the occupant is seated. This airbag device is the airbag device according to any one of the first to fifth aspects, and thus the same effects as any one of the first to fifth aspects can be obtained.

As described above, according to the present disclosure, installability can be improved while securing silencing performance in a configuration in which an inflator is installed at an upper part of a vehicle seat.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
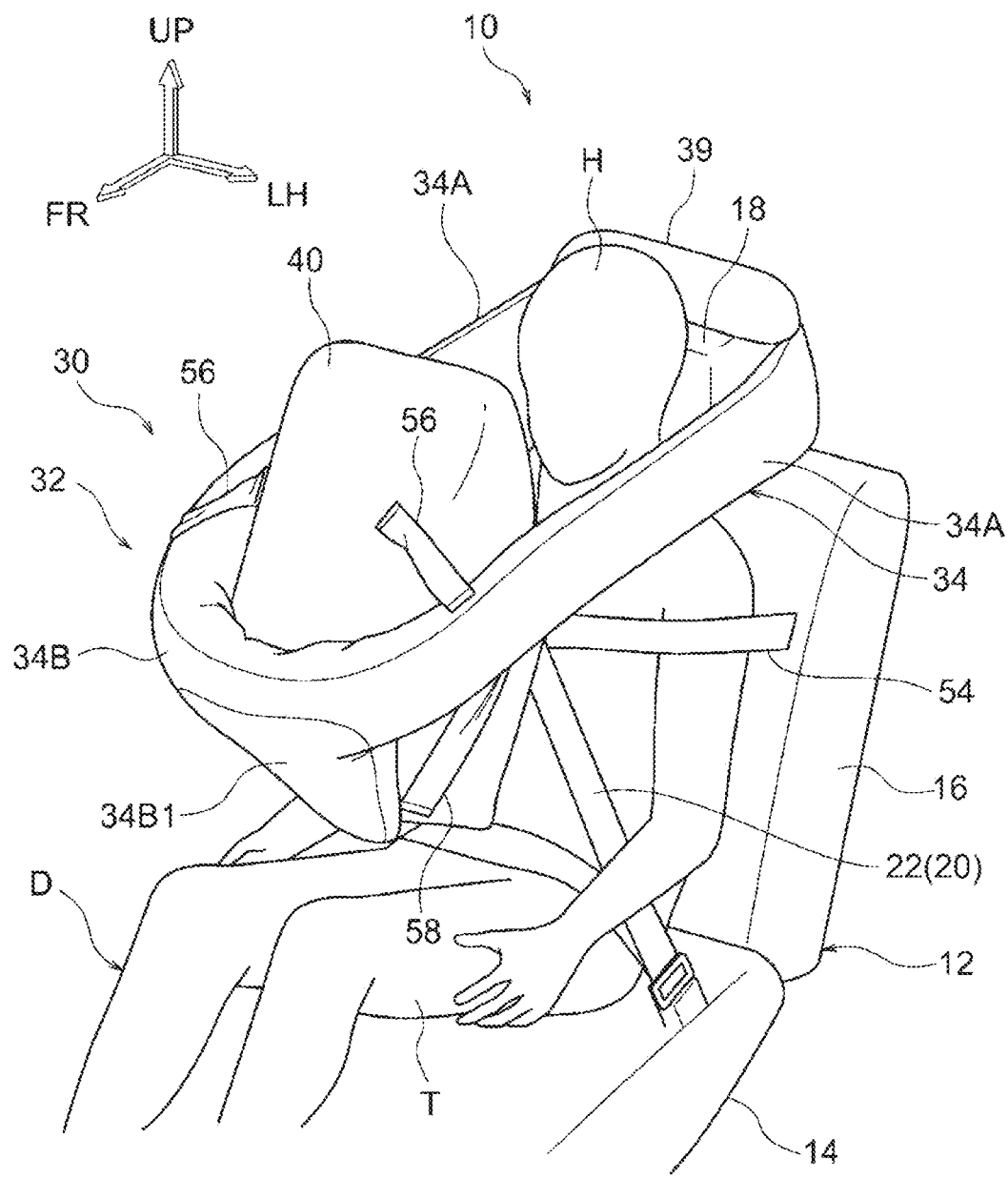
FIG. 1 is a perspective view illustrating a state in which an airbag is inflated and deployed in an occupant protection device according to an embodiment.

An occupant protection device 10 according to an embodiment of the present disclosure will be described below with reference to FIGS. 1 to 10. Note that in the drawings, some reference signs may be omitted in order to facilitate viewing of the drawings. Also, arrow FR, arrow UP, arrow LH, and arrow RH in the drawings as appropriate indicate a frontward direction (direction of advance), an upward direction, a left direction, and a right direction of a vehicle, respectively. Hereinafter, when description is made simply using directions of front-rear, right-left, and up-down, these mean front-rear in a vehicle front-rear direction, right-left in a vehicle right-left direction, and up-down in a vehicle up-down direction, unless specified otherwise.

As illustrated in FIGS. 1 to 5, the occupant protection device 10 is made up of a vehicle seat 12 and an airbag device 30. The vehicle seat 12 is a front seat or a rear seat of the vehicle (automobile). The vehicle seat 12 includes a seat cushion 14, a seat back 16 erected on an upward side of a rear end of the seat cushion 14, and a headrest 18 linked to an upper end portion of the seat back 16. The front-rear, right-left, and up-down directions of this vehicle seat 12 match the front-rear, right-left, and up-down directions of the vehicle.

Note that in FIGS. 1 to 5, a crash-test dummy D for a collision test is illustrated in a state of being seated on the seat cushion 14 of the vehicle seat 12, as a model of an occupant (seated person) to be protected. The crash-test dummy D is, for example, a frontal crash-test dummy (Hybrid III) AM50 (50th percentile for American male dummy). This crash-test dummy D is seated in a standard seating posture determined by the collision test method, and the vehicle seat 12 is located at a standard setting position corresponding to the seating posture. Hereinafter, the crash-test dummy D will be referred to as "occupant D", to facilitate description.

The occupant D seated on the seat cushion 14 of the vehicle seat 12 is restrained to the vehicle seat 12, by a seat belt 22 (see FIGS. 1 to 3, omitted from illustration in FIGS. 4 and 5) provided to a seat belt device 20. The seat belt device 20 is a three-point seat belt device, and is a seat belt device attached to a seat, in which a retractor that is omitted from illustration, and an anchor and a buckle (reference signs omitted) are provided to the vehicle seat 12.

Figure 2:
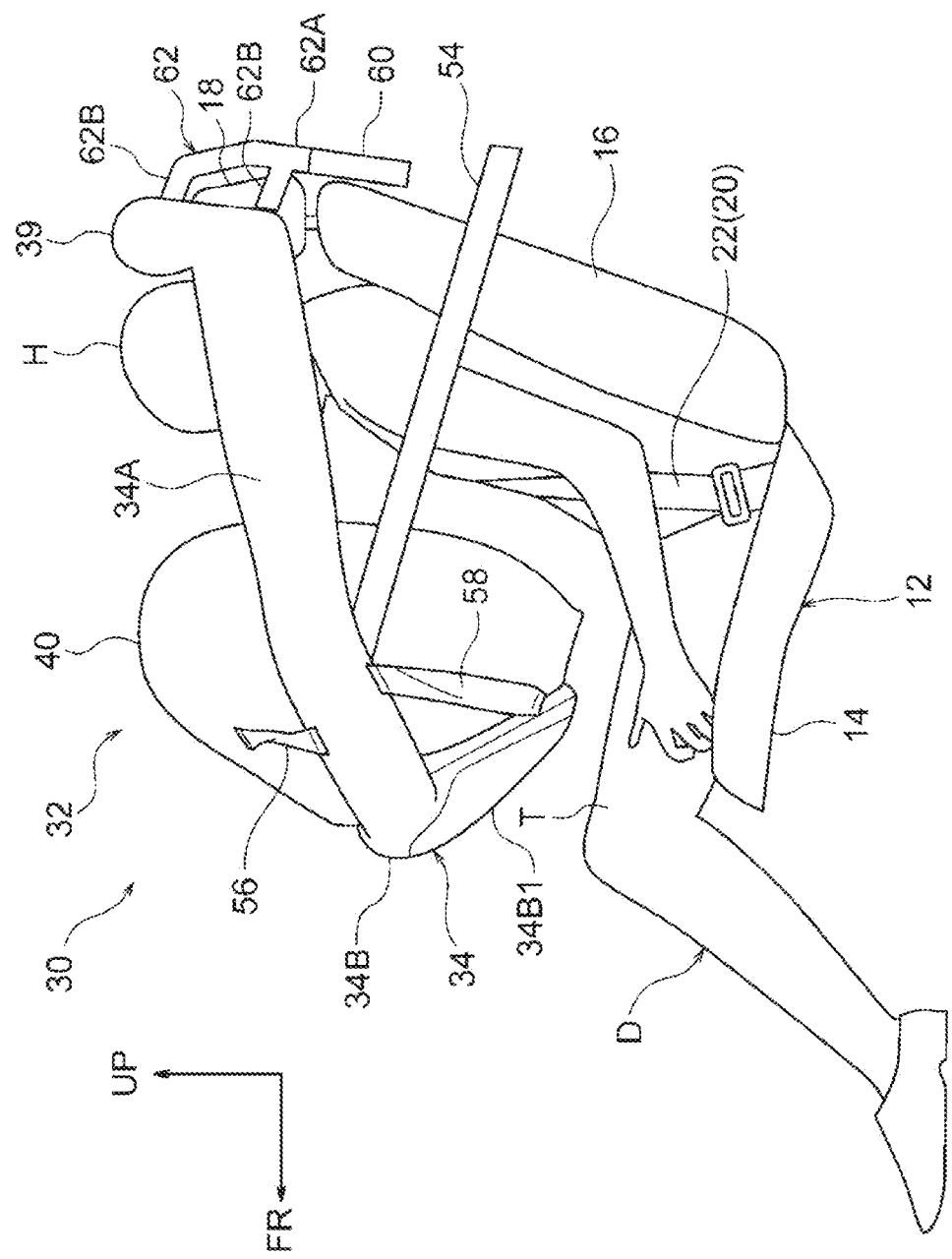
FIG. 2 is a side view of the configuration illustrated in FIG. 1 in a state as viewed from leftward of a vehicle.
Figure 3:
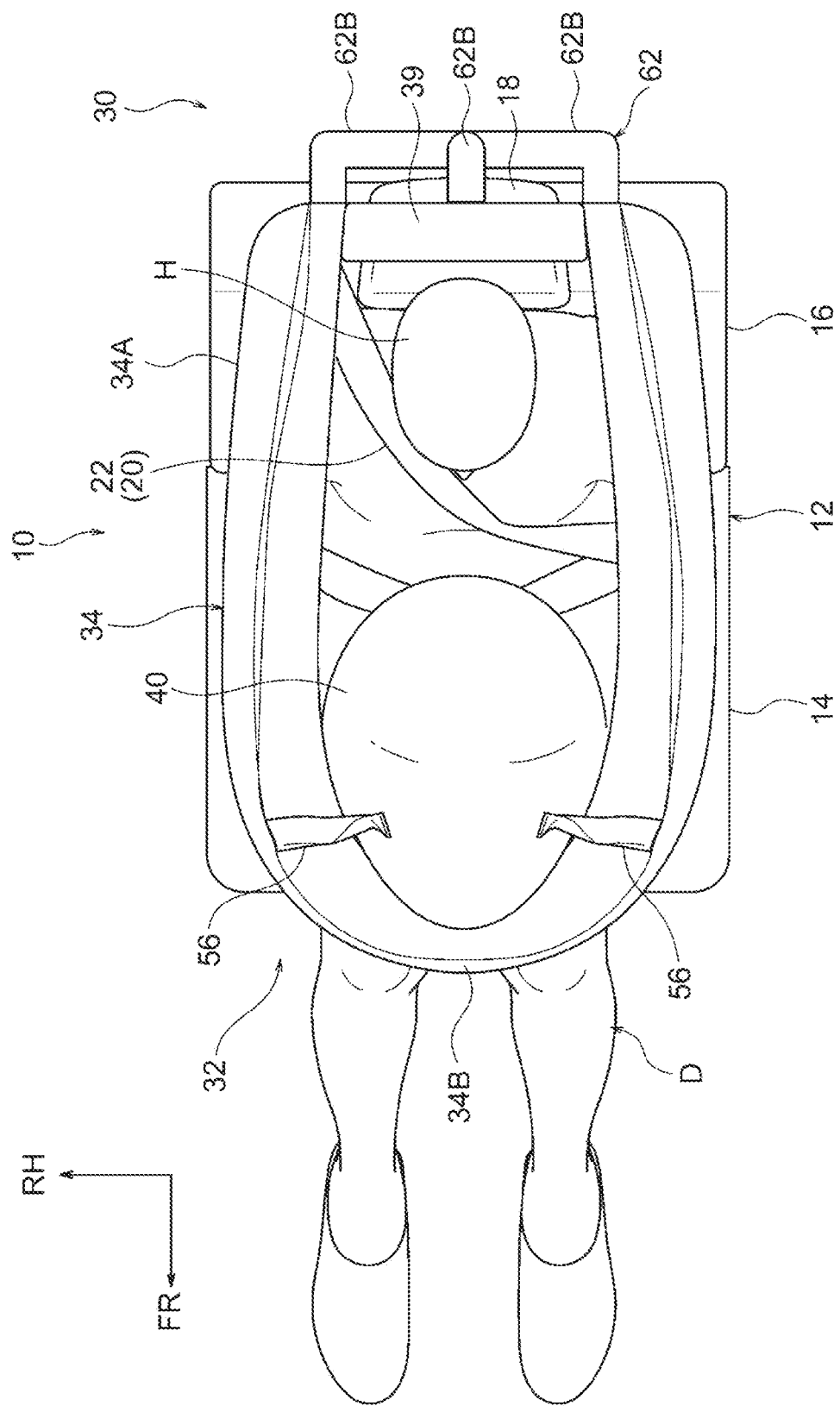
FIG. 3 is a plan view of the configuration illustrated in FIG. 1 in a state as viewed from upward of the vehicle.
Figure 4:
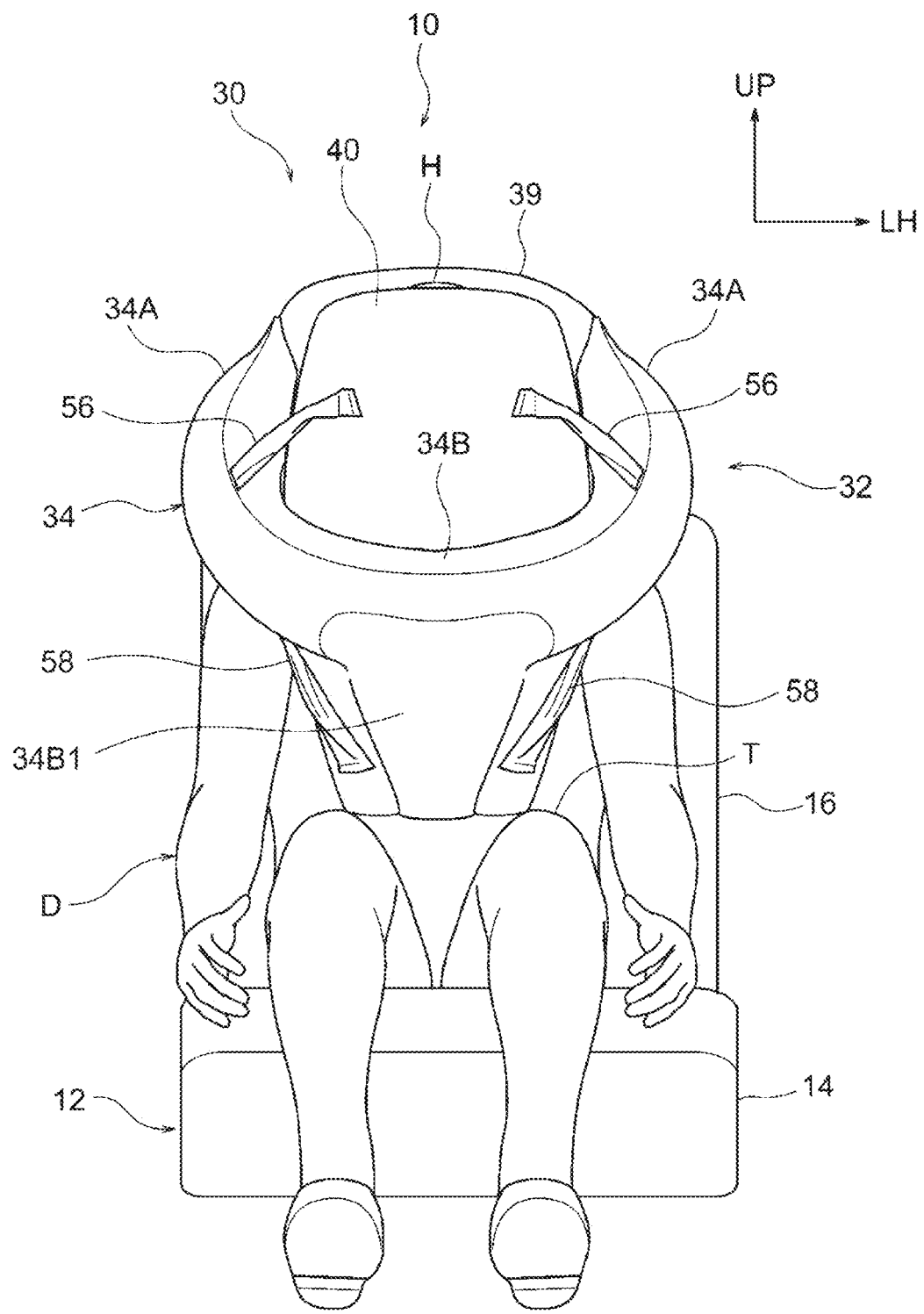
FIG. 4 is a frontal view of the configuration illustrated in FIG. 1 in a state as viewed from frontward of the vehicle.
Figure 5:
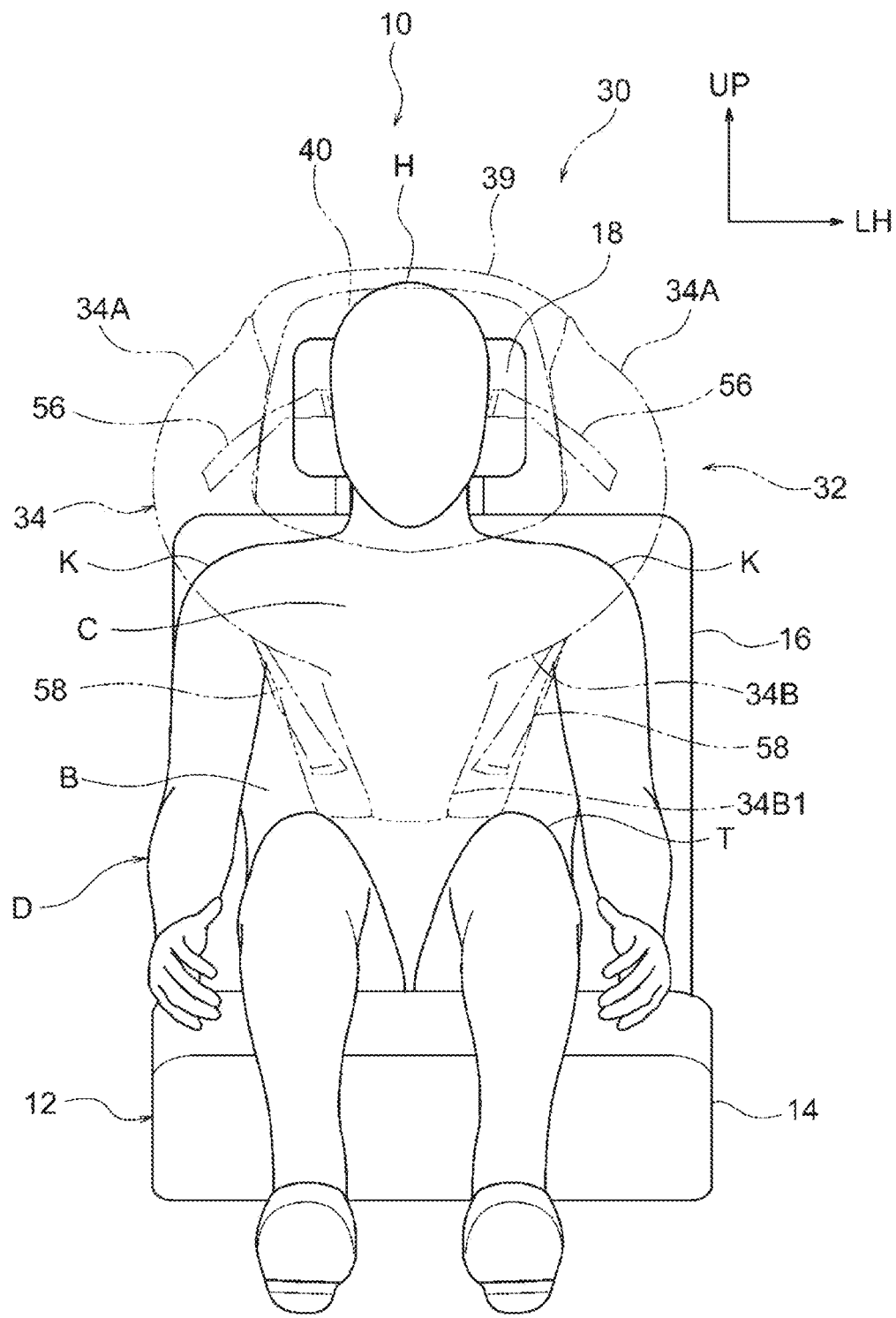
FIG. 5 is a frontal view in a state as seen through the airbag in FIG. 4.

The airbag device 30 includes an airbag 32, an inflator 60 (see FIG. 2), and a diffuser 62 (see FIGS. 2 and 3). The airbag 32 is, during normal use, housed in a folded state together with the inflator 60 and the diffuser 62 in a module case that is omitted from illustration. The module case is disposed rearward of an upper part of the vehicle seat 12 (specifically, rearward of the upper end portion of the seat back 16 and the headrest 18), and is fixed to the upper end portion of the seat back 16 or a vehicle body that is omitted from illustration.

The airbag 32 receives supply of gas from the inflator 60 and is inflated and deployed (deployed and inflated) from a rearward side (i.e. rear side) of the upper part of the vehicle seat 12 toward a frontward side (i.e. front side). This airbag 32 has a front-rear chamber 34, a pusher chamber 39, and an airbag body 40. The front-rear chamber 34 has a right and left pair of front-rear extending portions 34A (also referred to as pair of extending portions) that are inflated and deployed frontward by both right and left sides of the head H of the occupant D, and a linking portion 34B that connects front end portions of the front-rear extending portions 34A in the right-left direction. The pusher chamber 39 is inflated and deployed upward the headrest 18, and connects the rear end portions of the front-rear extending portions 34A in the right-left direction. The airbag body 40 is inflated and deployed toward the occupant D side (rearward side) later than the front-rear chamber 34, on a rearward side of the linking portion 34B.

Figure 6:
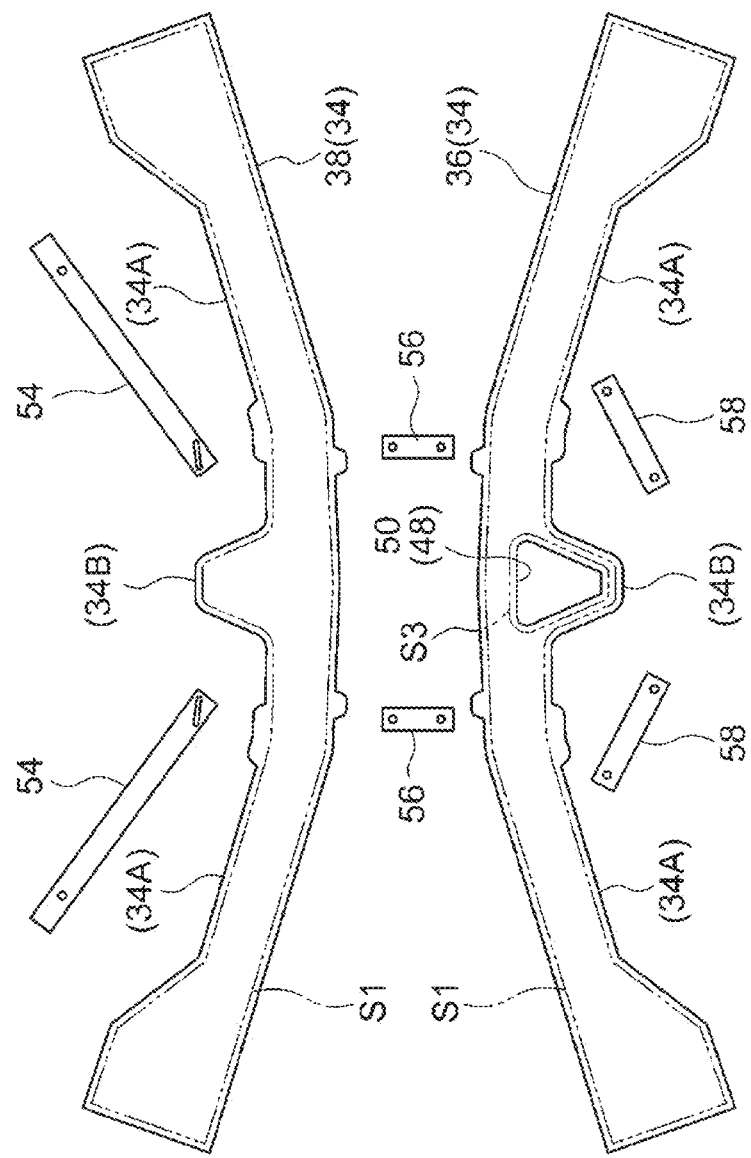
FIG. 6 is a development illustrating a front-rear chamber of the airbag.
Figure 7:
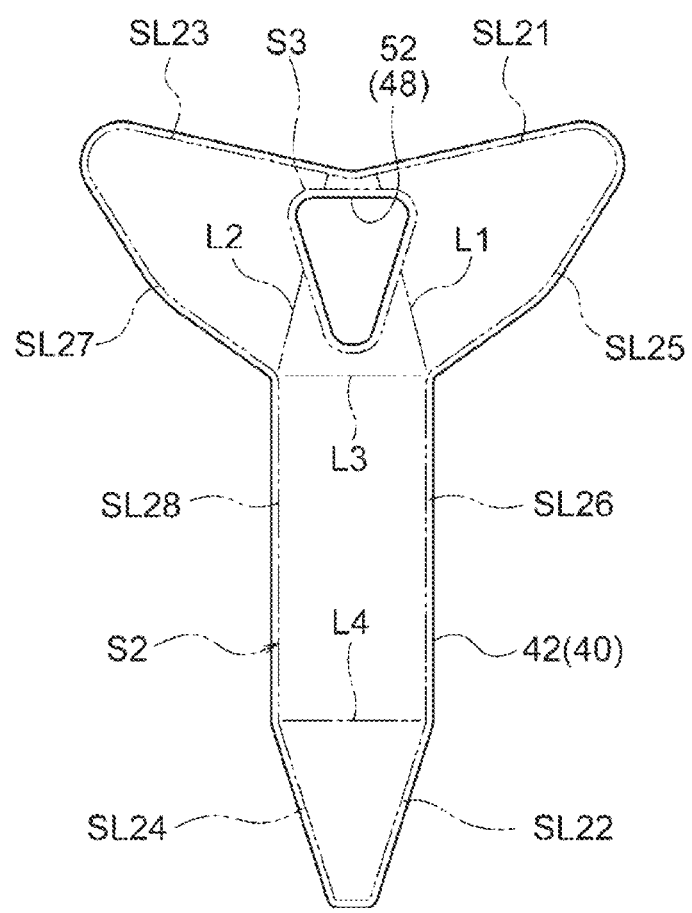
FIG. 7 is a development illustrating an airbag body of the airbag.

The front-rear chamber 34 is formed by laying two elongated base fabric pieces 36 and 38 illustrated in FIG. 6 on each other, and sewing peripheral edge portions thereof in sewing sections S1, thereby yielding an elongated bag-like article. The pusher chamber 39 is formed by laying two elongated base fabric pieces on each other, and sewing peripheral edge portions thereof in sewing sections, thereby yielding an elongated bag-like article, which is omitted from illustration. The airbag body 40 is formed into a bag-like article by folding one base fabric piece 42, illustrated in FIG. 7, along four fold lines L1, L2, L3, and L4 and sewing in a sewing section S2. In this sewing section S2, a sewing line SL21 and a sewing line SL22 are sewn, a sewing line SL23 and a sewing line SL24 are sewn, a sewing line SL25 and a sewing line SL26 are sewn, and a sewing line SL27 and a sewing line SL28 are sewn. The base fabric pieces 36, 38, and 42, and the base fabric pieces of the pusher chamber 39, are made of fabric such as nylon or polyester, for example. One or both of the two base fabric pieces 36 and 38 that make up the front-rear chamber 34 are fabric pieces that are less stretchable than the base fabric piece 42 that makes up the airbag body 40.

Both end sides of the front-rear chamber 34 in the longitudinal direction thereof make up the front-rear extending portions 34A, and a middle portion of the front-rear chamber 34 in the longitudinal direction thereof makes up the linking portion 34B. Each of the front-rear extending portions 34A is formed in a long tube-like shape. The linking portion 34B has a substantially letter-T bag-like shape that communicates with each of the front-rear extending portions 34A. Both end portions in the longitudinal direction of the pusher chamber 39 are connected to end portions (rear end portions) of the front-rear extending portions 34A on the side opposite to the linking portion 34B. The pusher chamber 39 communicates with the front-rear extending portions 34A.

The linking portion 34B of the front-rear chamber 34 is sewn to the airbag body 40 at a sewing section S3 (see FIGS. 6 and 7) provided at the middle portion of the linking portion 34B. The sewing section S3 has a substantially inverted trapezoidal shape in one example. A communicating hole 48 that enables inside of the linking portion 34B and inside of the airbag body 40 to communicate is formed on an inner side of the sewing section S3. The communicating hole 48 has a substantially inverted trapezoidal shape in one example. This communicating hole 48 is made up of a through hole 50 formed in the base fabric piece 36 of the front-rear chamber 34 and a through hole 52 formed in the base fabric piece 42 of the airbag body 40.

The front-rear chamber 34, the pusher chamber 39, and the airbag body 40 are folded according to a predetermined folding method, such as roll folding, bellows folding, or the like, and are housed in the module case during normal use. Gas from the inflator 60 is supplied to the front-rear extending portions 34A of the front-rear chamber 34, and to the pusher chamber 39, via the diffuser 62, which will be described in detail later. The inflator 60 is a combustion type or a cold gas type cylinder-type inflator, and generates gas when operated. Operations of the inflator 60 are controlled by a control device that is omitted from illustration, and the inflator 60 generates gas in the event of a vehicle collision.

The above inflator 60 is disposed at the upper part of the vehicle seat 12 (rearward from the upper end portion of the seat back 16 here), oriented such that an axial direction thereof follows the up-down direction of the seat back 16. The inflator 60 is provided with a pair of upper and lower stud bolts, for example. The stud bolts pass through a frame (omitted from illustration) of the seat back 16, for example, and a nut is screwed onto each stud bolt. Thus, the inflator 60 is fixed to the frame of the seat back 16.

When the inflator 60 operates, gas that is generated from a gas jetting portion 60A provided at an upper end portion of the inflator 60 passes through the diffuser 62 and is supplied to the front-rear extending portions 34A and to the pusher chamber 39. Thus, the front-rear extending portions 34A and the pusher chamber 39 begin to be inflated and deployed. The gas supplied to the front-rear extending portions 34A and the pusher chamber 39 flows toward the linking portion 34B side and is supplied into the airbag body 40 through the communicating hole 48. Thus, the airbag body 40 is inflated and deployed later than the front-rear chamber 34 and the pusher chamber 39. When the airbag 32 is inflated and deployed, a tear line that is omitted from illustration, formed in the module case, is configured to rupture under inflation pressure of the airbag 32. This enables the airbag 32 to be inflated and deployed outside of the module case.

The front-rear extending portions 34A that are inflated and deployed extend in the front-rear direction on both right and left sides of the head H of the occupant D, and face the head H from both the right and left sides with gaps therebetween. The front-rear extending portions 34A are pulled diagonally rearward and downward by a pair of right and left rear tethers 54, which will be described later, and are oriented so as to be inclined downward frontwardly. The front end portions of the front-rear extending portions 34A that are inflated and deployed are in a state of being connected in the right-left direction by the linking portion 34B that is inflated and deployed. As illustrated in FIG. 3, the front-rear chamber 34, including the front-rear extending portions 34A and the linking portion 34B, is inflated and deployed in a letter-U shape that opens rearward in plan view.

As illustrated in FIGS. 1, 2, 4, and 5, an enlarged portion 34B1, which has a dimension in the up-down direction that is larger than that at the right and left end portions of the linking portion 34B, is provided at a middle portion in the right-left direction of the linking portion 34B that is inflated and deployed. This enlarged portion 34B1 protrudes further to the downward side than the right and left end portions of the linking portion 34B. The aforementioned communicating hole 48 is formed in this enlarged portion 34B1. This communicating hole 48 is situated on the rearward side of the middle portion in the right-left direction of the linking portion 34B that is inflated and deployed. Gas from the inflator 60 is supplied in a rearward direction into the airbag body 40 through the communicating hole 48. Thus, the airbag body 40 is inflated and deployed toward the occupant D side (rearward side) later than the front-rear chamber 34, rearward of the linking portion 34B. The airbag body 40 passes through a gap between the head H of the occupant D and a ceiling of the vehicle (omitted from illustration) from the rearward side to the frontward side, by the front-rear chamber 34 being inflated and deployed, and then is inflated and deployed toward the rearward side.

During the above passage, the airbag body 40 is pushed to the frontward side by the pusher chamber 39, which is inflated and deployed before the airbag body 40, thereby promoting inflation and deployment of the airbag body 40 to the frontward side. The airbag body 40 that is inflated and deployed faces the head H, the chest C, and the abdomen B of the occupant D from the frontward side with gaps therebetween. Thus, the occupant D, who is moving toward the frontward side under inertia due to impact of the vehicle collision, is restrained from the frontward side by the airbag body 40 that is inflated and deployed. At this time of occupant restraint, the front-rear chamber 34 is stretched in the front-rear direction, and the airbag body 40 is compressed in the front-rear direction. The shape of the airbag body 40 is set so as to be interposed between the thighs T and the chest C of the occupant D during the middle to late stages of the occupant restraint.

As illustrated in FIGS. 1 to 6, the airbag 32 has attached thereto the right and left rear tethers 54, a pair of right and left front upper tethers 56, and a pair of right and left front lower tethers 58. The rear tethers 54, the front upper tethers 56, and the front lower tethers 58 are made of, for example, a nylon-based or polyester-based fabric material in shapes of long bands. The fabric materials making up the rear tethers 54, the front upper tethers 56, and the front lower tethers 58 are configured to be less stretchable than the base fabric pieces 36 and 38 that make up the front-rear chamber 34 and the base fabric piece 42 that makes up the airbag body 40. This nature of being less stretchable can be adjusted by adjusting the material, thickness, and so forth of the fabric.

End portions of each of the rear tethers 54 on one end side are respectively retained (sewn) to an intermediate portion of the front-rear extending portions 34A in a longitudinal direction thereof (specifically, front portion of each front-rear extending portion 34A that has been inflated and deployed). Other end portions of the rear tethers 54 are respectively retained to the seat back 16 or the vehicle body (omitted from illustration) on the rearward side of the occupant D. In the state in which the airbag 32 is inflated and deployed, the rear tethers 54 extend in the front-rear direction below the front-rear extending portions 34A. In this state, the rear tethers 54 are oriented so as to be inclined downward toward the rear. Thus, the front-rear extending portions 34A are configured to be drawn back diagonally downward and rearward by the rear tethers 54. This suppresses the airbag 32 from swinging in the up-down direction and the front-rear direction when inflation and deployment of the airbag 32 is complete.

By this configuration in which the front-rear extending portions 34A are drawn back as described above, lower faces of the front-rear extending portions 34A abut against right and left shoulders K of the occupant D when the airbag 32 restrains the occupant. At the time of occupant restraint by the airbag 32, the airbag body 40 is supported by tensile loads of the front-rear extending portions 34A and the rear tethers 54. In the present embodiment, the occupant D is AM50, but even when the occupant D is AM95 (95th percentile for American adult males) or when the occupant D is AF05 (5th percentile for American adult females), the length of the rear tethers 54 is set so that the lower faces of the front-rear extending portions 34A will come into contact with the right and left shoulders K of the occupant D.

The front upper tethers 56 link right and left portions of a front portion of an upper part of the airbag body 40 that is inflated and deployed on the upward side from the front-rear chamber 34, and the front portions of the front-rear extending portions 34A respectively. One end portion of each of the front upper tethers 56 is respectively sewn to right and left side portions of the front part of the upper part of the airbag body 40 that is inflated and deployed on the upward side from the front-rear chamber 34. The other end portions of the front upper tethers 56 are sewn to the front portions of the front-rear extending portions 34A, respectively. The front upper tethers 56 suppress the airbag body 40 from rotating upward about the linking portion 34B when inflation and deployment of the airbag 32 is complete.

The front lower tethers 58 link the right and left portions of the lower portion of the airbag body 40 that is inflated and deployed to the downward side from the front-rear chamber 34 to the front portions of the front-rear extending portions 34A, respectively. One end portion of each of the front lower tethers 58 is sewn to the right and left side portions of the lower portion of the airbag body 40 that is inflated and deployed on the downward side from the front-rear chamber 34, respectively. The other end portion of each of the front lower tethers 58 is sewn to the front portions of the front-rear extending portions 34A, respectively. The front lower tethers 58 suppress the airbag body 40 from rotating downward about the linking portion 34B when inflation and deployment of the airbag 32 is complete.

The airbag device 30 described above includes a control device (electronic control unit (ECU)), omitted from illustration, that controls operations of the inflator 60. The control device is electrically connected to the inflator 60 and a collision sensor that is omitted from illustration. The control device is capable of detecting or predicting occurrence of various forms of frontal collisions (or the unavoidability of frontal collisions) for the automobile to which it is applied, for each form of collision described below, based on information from the collision sensor.

The control device operates the inflator 60 when detecting or predicting a frontal collision based on information from the collision sensor. Note that the forms of frontal collisions in which the control device operates the inflator 60 include not only full-wrap frontal collisions but also offset frontal collisions such as oblique collisions, small overlap collisions, and so forth.

Figure 8:
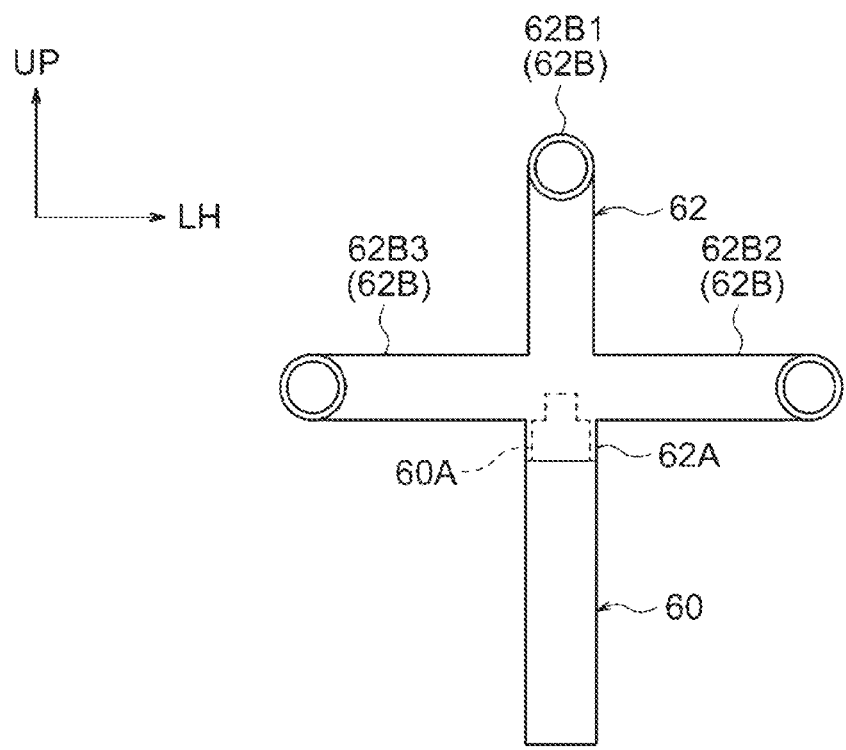
FIG. 8 is a frontal view illustrating a diffuser and an inflator.
Figure 9:
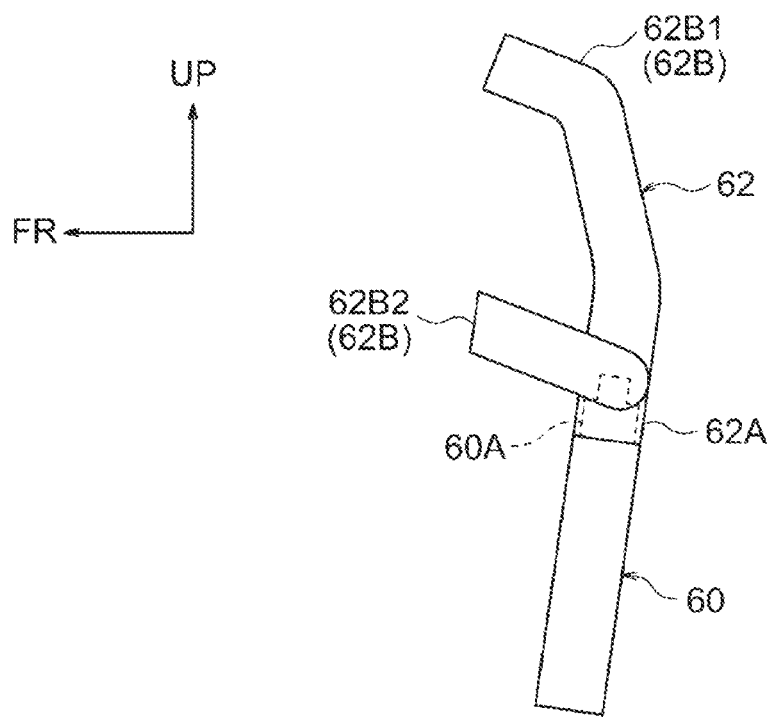
FIG. 9 is a side view illustrating the diffuser and the inflator.
Figure 10:
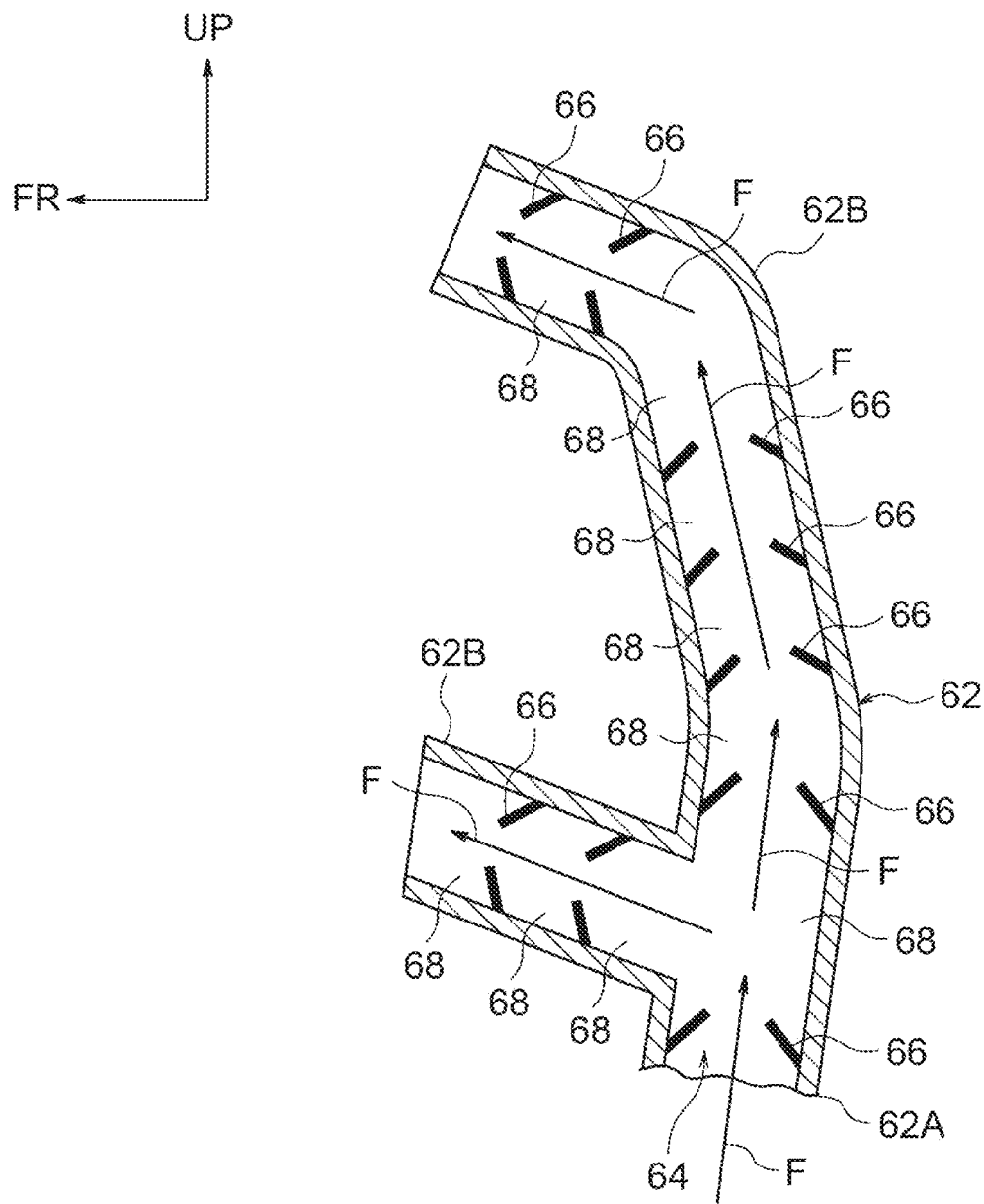
FIG. 10 is a sectional view illustrating the diffuser.

As illustrated in FIGS. 8 and 9, the diffuser 62 that distributes gas from the inflator 60 to the airbag 32 has a connecting portion 62A connected to the inflator 60, and a plurality of (three here) branching portions 62B branching from the connecting portion 62A, and is configured as a four-way-branched tubular form. The diffuser 62 is made of a heat-resistant material such as metal or the like, for example. The connecting portion 62A is fixed to the inflator 60 in a state in which the upper end portion of the inflator 60 is fitted inside thereof. The three branching portions 62B extend toward the upward side from the connecting portion 62A, and are made up of a branching portion 62B1 of which a distal end portion is bent toward the frontward side at the upward side of the headrest 18, a branching portion 62B2 that extends from the connecting portion 62A to the leftward side and of which a distal end portion is bent toward the frontward side on the leftward side of the headrest 18, and a branching portion 62B3 that extends from the connecting portion 62A to the rightward side and of which a distal end portion is bent toward the frontward side on the rightward side of the headrest 18. These branching portions 62B1, 62B2, and 62B3 are routed so as to extend from the rearward side of the headrest 18 to the frontward side, circumventing the headrest 18.

The distal end portion of the branching portion 62B1 extending to the upward side is inserted into a connection hole that is omitted from illustration formed in the pusher chamber 39 at a middle portion thereof in the longitudinal direction. An edge portion of the connection hole in the pusher chamber 39 is fixed to the distal end portion of the branching portion 62B1 using, for example, a metal band. The distal end portion of the branching portion 62B2 extending to the leftward side is inserted into a connection hole that is omitted from illustration, formed at the rear end portion of the front-rear extending portion 34A on the left side. An edge portion of the connection hole in the front-rear extending portion 34A on the left side is fixed to the distal end portion of the branching portion 62B2 using, for example, a metal band. The distal end portion of the branching portion 62B3 extending to the rightward side is inserted into a connection hole that is omitted from illustration, formed at the rear end portion of the front-rear extending portion 34A on the right side. An edge portion of the connection hole in the front-rear extending portion 34A on the right side is fixed to the distal end portion of the branching portion 62B3 using, for example, a metal band.

In the above diffuser 62, the branching portion 62B1 communicates with the pusher chamber 39, the branching portion 62B2 communicates with the front-rear extending portion 34A on the left side, and the branching portion 62B3 communicates with the front-rear extending portion 34A on the right side. Accordingly, a configuration is made in which gas that is generated from the gas jetting portion 60A of the inflator 60 is distributed to the pusher chamber 39 and the front-rear extending portions 34A on the right and the left, through the respective branching portions 62B1, 62B2, and 62B3.

Inside this diffuser 62, a plurality (a great number here) of partition walls 66 is provided. Specifically, the partition walls 66 are provided in each of the three branching portions 62B. The great number of the partition walls 66 make up a silencing portion 64. The inside of the diffuser 62 is partitioned into a plurality (a great number here) of chambers 68 by the great number of partition walls 66, and the chambers 68 communicate with each other. Each partition wall 66 is made of metal, for example, and has a truncated conical shape (a disc-spring-like shape) that is inclined (diameter reduced) toward a downstream side in a flow direction F of the gas flowing inside the diffuser 62. An opening (reference sign omitted) is formed in a middle portion of each partition wall 66, and the chambers 68 communicate with each other through the openings of the partition walls 66. Thus, the diffuser 62 functions as a partition-wall-type silencer, whereby a configuration is made in which the sound pressure of the gas from the inflator 60 is reduced.

Operations and Effects

Next, operations and effects of the present embodiment will be described.

The occupant protection device 10 according to the present embodiment includes the vehicle seat 12 in which the occupant D of the automobile is seated, and the airbag device 30 that protects the occupant D in the event of a collision of the vehicle. In this airbag device 30, in the event of a collision of the vehicle, gas generated by the inflator 60 installed in the upper part of the vehicle seat 12 is guided to the diffuser 62 and distributed to the airbag 32, and the airbag 32 is inflated and deployed to the frontward side from the upper part of the vehicle seat 12.

The diffuser 62 has the connecting portion 62A connected to the inflator, and the branching portions 62B that are branched from the connecting portion 62A and each connected to the airbag 32, whereby the gas is distributed to a plurality of locations in the airbag 32 through the branching portions 62B. In this diffuser 62, the connecting portion 62A and the branching portions 62B are provided with the silencing portion 64 (the great number of partition walls 66) that reduces the sound pressure of the gas, and accordingly even when the diameters of the connecting portion 62A and the branching portions 62B are each set to be small, the sound pressure of the gas is reduced in each of the connecting portion 62A and the branching portions 62B, so that the silencing performance can be ensured. As a result, even in a configuration in which the inflator 60 is mounted near the headrest 18, which is near to the cars of the occupant D, the cars of the occupant D can be kept from being adversely affected. Moreover, the branching portions 62B each having a small diameter can be routed to fit into space at the upper part of the vehicle seat 12, installability at the upper part of the vehicle seat 12 can be improved. Further, the diffuser 62 that distributes gas to multiple locations in the airbag 32 functions as a silencer, and accordingly there is no need to perform work to fix a dedicated silencer to the inflator 60.

Also, in the present embodiment, the airbag 32 has the front-rear chamber 34, the pusher chamber 39, and the airbag body 40. The front-rear chamber 34 includes the front-rear extending portions 34A on the right and left, that are inflated and deployed to the frontward side by both right and left sides of the head H of the occupant D seated in the vehicle seat 12. The pusher chamber 39 is inflated and deployed upward the headrest 18, and connects the rear end portions of the front-rear extending portions 34A in the right-left direction. The airbag body 40 is supplied with gas from the inflator 60 through the front-rear chamber 34, and is inflated and deployed in front of the occupant D. The branching portions 62B of the diffuser 62 are connected to the front-rear extending portions 34A and the pusher chamber 39. Accordingly, gas from the inflator 60 can be distributed to each of the front-rear extending portions 34A and the pusher chamber 39, and accordingly, installation space, manufacturing costs, and the number of parts can be reduced as compared to a configuration in which gas is supplied to each of the front-rear extending portions 34A and the pusher chamber 39 from separate inflators, for example.

Further, in the present embodiment, the front-rear chamber 34 includes the linking portion 34B that connects the front end portions of the front-rear extending portions 34A in the right-left direction, and the airbag body 40 is inflated and deployed toward the occupant D side, later than the front-rear chamber 34, on the rearward side of the linking portion 34B. At the time of restraint of the occupant D, the front-rear chamber 34 is stretched in the front-rear direction, and the airbag body 40 is compressed in the front-rear direction. This compressive deformation of the airbag body 40 can improve energy absorption performance.

Further, in the present embodiment, the silencing portion 64 is made up of the partition walls 66 provided inside the diffuser 62, the inside of the diffuser 62 is partitioned into the chambers 68 by the partition walls 66, and the chambers 68 communicate with each other. Accordingly, the diffuser 62 functions as a partition-wall-type silencer, by which the sound pressure of the gas from the inflator 60 can be effectively reduced. Also, since the partition walls 66 also function as reinforcing members that reinforce the diffuser 62, wall thickness of the diffuser 62 can be reduced.

Moreover, each partition wall 66 has a truncated conical shape that is inclined (diameter reduced) toward the downstream side in the flow direction F (see FIG. 10) of the gas flowing inside the diffuser 62. Accordingly, the flow of gas flowing inside the diffuser 62 can be suppressed from being obstructed by the partition walls 66.

Note that in the above embodiment, the number of partition walls 66, the direction of inclination of the partition walls 66, and the respective wall thicknesses of the diffuser 62 and the partition walls 66 are preferably adjusted taking into consideration the gas flow within the diffuser 62, the sound pressure, the strength, and so forth.

Figure 11:
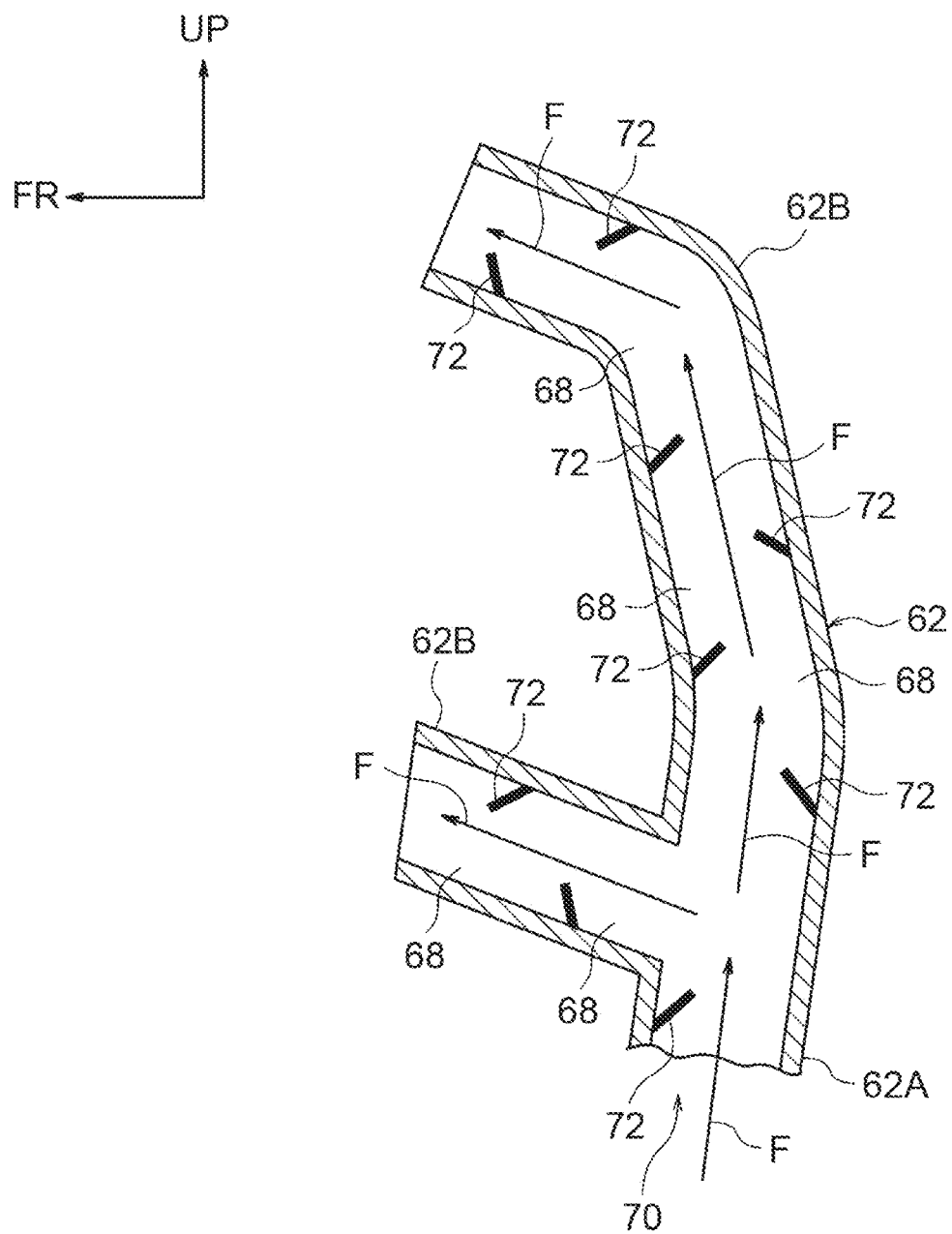
FIG. 11 is a sectional view illustrating a modification of the diffuser.

For example, as in a modified example illustrated in FIG. 11, a silencing portion 70 may be made up of a plurality of partition walls 72 that are inclined toward the downstream side in the flow direction F of the gas flowing inside the diffuser 62, and are disposed offset from each other in the flow direction F.

Also, in the above embodiment and the above modification, a case has been described in which the silencing portions 64 and 70 are made up of the partition walls 66 and 72 provided inside the diffuser 62, but this is not restrictive. The silencing portion may be, for example, glass wool, steel wool, or the like, that is provided inside the diffuser 62.

Also, in the above embodiment, the airbag 32 has the configuration including the front-rear chamber 34, the pusher chamber 39, and the airbag body 40, but the configuration of the airbag 32 is not limited to this, and can be changed as appropriate. For example, the airbag 32 can be changed to a configuration in which the airbag 32 does not have the pusher chamber 39, and has front-rear chamber 34 on the right and left, and the airbag body 40.

In addition, the present disclosure can be implemented with various modifications without departing from the spirit thereof. Further, it goes without saying that the scope of rights of the present disclosure is not limited to the above-described embodiment.

What is claimed is:

1. An airbag device comprising:
an inflator that is installed in an upper part of a vehicle seat, and that generates gas in an event of a vehicle collision;
an airbag to which the gas is supplied, and inflated and deployed from the upper part of the vehicle seat toward a front side of the vehicle seat; and
a diffuser that includes a connecting portion and a plurality of branching portions, and that distributes the gas to the airbag, the connecting portion being connected to the inflator, and the branching portions each branching from the connecting portion and connecting to the airbag, the diffuser including a silencing portion in at least the branching portions, the silencing portion that reduces sound pressure of the gas, wherein:
the silencing portion is a plurality of partition walls provided inside the diffuser;
the inside of the diffuser is partitioned into a plurality of chambers by the partition walls, and the chambers communicate with each other; and
the partition walls are inclined toward a downstream side in a flow direction of the gas flowing inside the diffuser.

2. The airbag device according to claim 1, wherein:
the airbag includes
a front-rear chamber including a pair of extending portions, in which the extending portions are configured to be inflated and deployed toward the front side of the vehicle seat by both right and left sides of a head of an occupant seated in the vehicle seat, and the extending portions extend in a front-rear direction, and
an airbag body to which the gas is supplied through the front-rear chamber, and is inflated and deployed in front of the occupant; and
the branching portions of the diffuser are connected to at least the extending portions.

3. The airbag device according to claim 2, wherein:
the front-rear chamber includes a linking portion that connects front end portions of the extending portions in a right-left direction of the vehicle seat; and
the airbag body is inflated and deployed toward an occupant side later than the front-rear chamber, on a rear side of the linking portion in a front-rear direction of the vehicle seat.

4. An occupant protection device, comprising:
a vehicle seat in which an occupant is seated; and
the airbag device according to claim 1 that is installed in the upper part of the vehicle seat.

5. The airbag device according to claim 1, wherein the partition walls project inward from an inner surface of the diffuser.

6. The airbag device according to claim 1, wherein the partition walls have a truncated conical shape.

* * * * *